No. 655,016.  
E. G. N. SALENIUS.  
REFRIGERATING DEVICE FOR CENTRIFUGAL APPARATUS.  
(Application filed Dec. 29, 1897.)  
Patented July 31, 1900.
(No Model.)  
2 Sheets—Sheet 1.
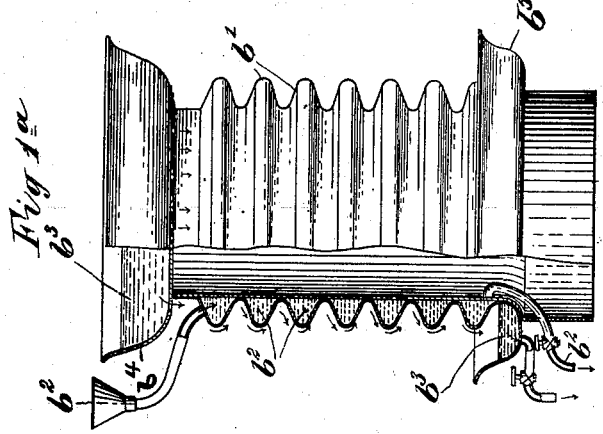
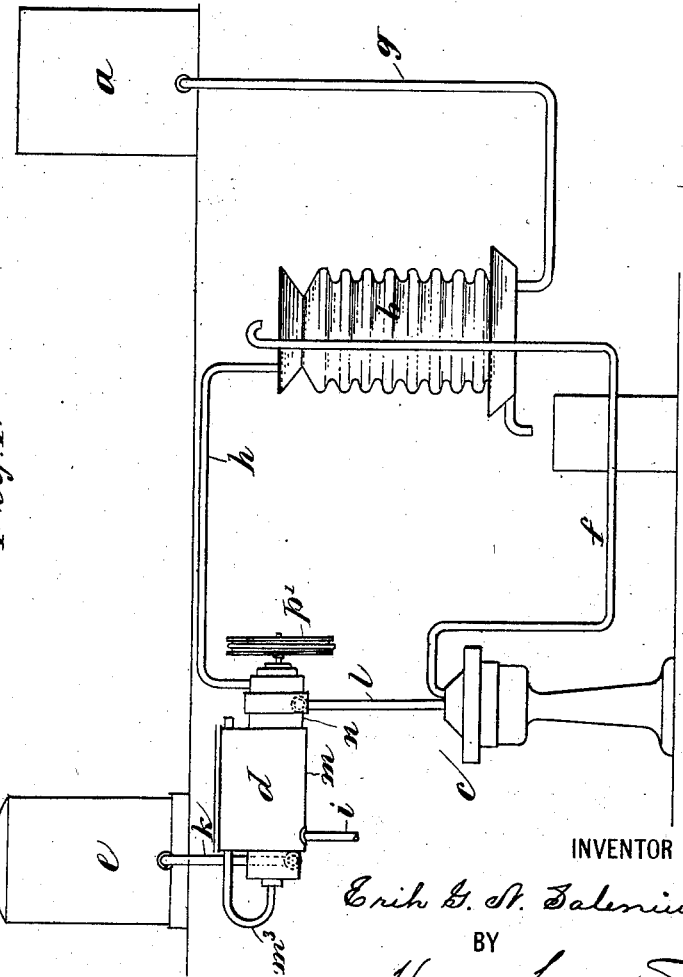
WITNESSES:  
INVENTOR  
ATTORNEY No. 655,016. Patented July 31, 1900.
E. G. N. SALENIUS.
REFRIGERATING DEVICE FOR CENTRIFUGAL APPARATUS.
(Application filed Dec. 29, 1897.)
(No Model.) 2 Sheets—Sheet 2.
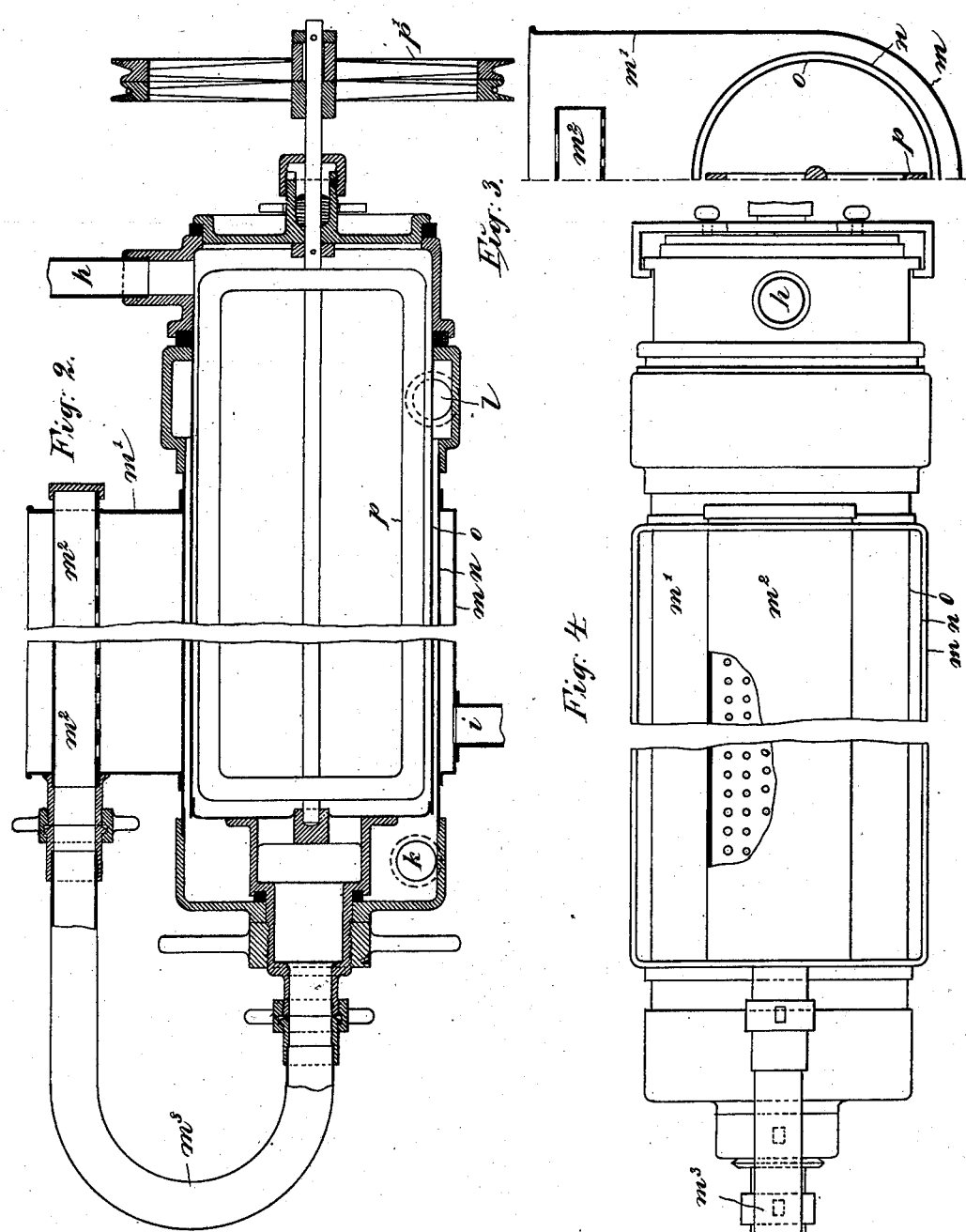

UNITED STATES PATENT OFFICE.

ERIK GUSTAF NICOLAUS SALENIUS, OF ALBANO, SWEDEN.

REFRIGERATING DEVICE FOR CENTRIFUGAL APPARATUS.

SPECIFICATION forming part of Letters Patent No. 655,016, dated July 31, 1900.

Application filed December 29, 1897. Serial No. 664,419. (No model.)

*To all whom it may concern:*

Be it known that I, ERIK GUSTAF NICOLAUS SALENIUS, mechanical engineer, a subject of the King of Sweden and Norway, and a resident of Albano, in the Kingdom of Sweden, have invented certain new and useful Improvements in Refrigerating Devices for Centrifugal Apparatus, (for which I have obtained a patent in France, No. 264,237, dated February 19, 1897, and in Great Britain, No. 579,197, dated March 4, 1897,) of which the following is a specification, reference being had therein to the accompanying drawings.

This invention relates to a refrigerating device to be used in the centrifugal separation of liquids, more especially milk. The milk or liquid in order to make it keep well is heated before its introduction into the centrifugal apparatus and cooled subsequent to the centrifugal treatment. The cooling operation is carried out with this invention in a more satisfactory manner than heretofore, and as a result the consumption of ice is materially reduced.

The invention consists in placing the cooler for the liquid discharging from the centrifugal apparatus, as cream or skim-milk, in communication with a second cooler, by means of which the heated liquid is cooled before being introduced into the centrifugal apparatus, the same cooling fluid thus being used for cooling the liquid discharging from the centrifugal apparatus and that which is to enter said apparatus.

For the sake of brevity the treatment of milk only is referred to in the following.

Figure 1 shows the general arrangement of the system in question. Fig. 1$^a$ is a detail view of the cooler for the cream or skim-milk. Fig. 2 shows a longitudinal section, and Fig. 3 a transverse section, of a cooler. Fig. 4 shows the latter viewed from above.

Referring to Fig. 1, $a$ designates the reservoir containing the cooling liquid; $b$, the cooler for the cream or skim-milk discharging from the centrifugal apparatus $c$; $d$, the cooler for the milk which is to be introduced into the centrifugal apparatus, and $e$ the container which supplies the latter milk. The cream or skim-milk is conducted through the pipe $f$ to the cooler $b$, and the cooling liquid flows through the pipe $g$ to the latter from the reservoir $a$. On passing through the cooler $b$ the cooling liquid flows through the pipe $h$ to the cooler $d$ and subsequently out by the pipe $i$. From the container $e$ the sterilized milk passes by the pipe $k$ to the cooler $d$, and thence to the centrifugal apparatus $c$ by the pipe $l$. The cooling liquid on passing through $b$ and cooling off the cream or skim-milk to the desired temperature flows to $d$, where it cools the relatively-hotter milk coming from $e$. The heat now stored in the cooling liquid may be utilized by using the latter for feeding the boiler or similar purpose.

In order to make the cooler $d$ efficient, it may be arranged as shown in Figs. 2, 3, and 4. It is composed of three cylinders $m$, $n$, and $o$, one inclosing the others, so as to leave spaces between them, as seen from Fig. 2. The outer cylinder is provided at the top with a wide drawer-like opening $m'$, in which is placed another vessel or compartment $m^2$, communicating by means of a pipe $m^3$ with the inner cylinder $o$. The compartment $m^2$ has its bottom perforated, and in the interior of the cylinder $o$ there is a rotating agitator $p$, driven by means of a belt passing over the belt-pulley $p'$. The sterilized milk is conducted through the pipe $k$ into the cylinder $n$, spreading between the latter and the cylinder $o$ in the shape of a thin layer to be subsequently conducted to the centrifugal apparatus by the pipe $l$. The cooling liquid enters through $h$ in the cylinder $o$, whence it rises through the pipe $m^3$ to the compartment $m^2$. Through the perforated bottom of the latter the liquid drops in fine jets onto the cylinder $n$, and while surrounding said cylinder it passes on to the outlet $i$ of the cylinder $m$. The milk is thus distributed in a thin layer, surrounded on each side by cooling liquid and separated from it by thin plate walls only. It is evident that an apparatus of corresponding arrangement can be used for heating purposes—for instance, in the sterilization of milk not treated in the centrifugal apparatus, the cooling agent in this case apparently being replaced by some heating fluid. If the opening $m'$ at the top of compartment $m^2$ be closed, some gaseous fluid might be employed as the heating or cooling agent.

The cooler $b$ for the cream and skim-milk is not new in itself; but its construction is illustrated somewhat in detail in Fig. 1ª, which shows it on a scale somewhat larger than it is shown in Fig. 1 and partly in section. The outer shell $b'$ is spirally corrugated to form a spiral passage through which flows the cooling liquid $b^2$. This liquid is admitted at the top and may be drawn off at the bottom. The cream or skimmed milk flows from a basin $b^3$ at the top through numerous apertures $b^4$ onto the corrugated surface of the shell $b'$ and down over this surface to a basin $b^5$ below.

Having now described my invention, what I claim as new, and desire to secure by Letters Patent, is—

1. The combination with a centrifugal apparatus, a primary cooler, which cools the liquid to be treated on its way to the centrifugal apparatus, a second cooler which cools the liquid coming from the said apparatus, conduits for conducting through the apparatus the liquid to be treated, and pipes conducting a cooling liquid under a head or pressure, first to the second cooler and then, after it shall have passed through this cooler, to the primary cooler through which it finally passes, whereby the second cooler is first acted upon by the cooling liquid, substantially as set forth.

2. The combination with the three cylinders $m$, $n$ and $o$, arranged one within the other and having interspaces between them, of the vessel $m^2$, having a perforated bottom and situated over an aperture in the upper side of the outer cylinder $m$, and a conduit $m^3$, connecting said vessel with the interior of the inner cylinder $o$, said inner cylinder having an inlet for a temperature-changing liquid, the cylinder $m$ having an outlet for said liquid, and the cylinder $n$ having an inlet and an outlet for the liquid of which the temperature is to be changed, substantially as set forth.

3. The combination with the three cylinders $m$, $n$ and $o$, arranged one within the other and having interspaces between them, of the vessel $m^2$, having a perforated bottom and situated over an aperture in the upper side of the outer cylinder $m$, a conduit $m^3$ connecting said vessel with the interior of the inner cylinder $o$, and a rotating agitator in the inner cylinder, said inner cylinder having an inlet for a temperature-changing liquid, the cylinder $m$ having an outlet for said liquid, and the cylinder $n$ having an inlet and an outlet for the liquid of which the temperature is to be changed, substantially as set forth.

In witness whereof I have hereunto signed my name in the presence of two subscribing witnesses:

ERIK GUSTAF NICOLAUS SALENIUS.

Witnesses:
ERNST SVANQVIST,
E. HERMANSSON.